United States Patent [19]

Gastebois et al.

[11] Patent Number: 4,899,539
[45] Date of Patent: Feb. 13, 1990

[54] FLOW MIXER AND FLAME STABILIZER FOR A TURBOFAN ENGINE

[75] Inventors: Philippe M. D. Gastebois, Vert Saint Denis; Alain G. J. Habrard, St Martin en Biere; Jean L. Picard, Vaux le Penil, all of France

[73] Assignee: Societe Nationale d'Etude et de Construction de Moteurs d'Aviation (SNECMA), Paris, France

[21] Appl. No.: 295,998

[22] Filed: Jan. 12, 1989

[30] Foreign Application Priority Data

Jan. 14, 1988 [FR] France ................................. 88 00345

[51] Int. Cl.[4] .............................................. F02K 3/10
[52] U.S. Cl. ....................................... 60/261; 60/262; 60/749
[58] Field of Search ...................... 60/261, 749, 226.3, 60/262, 39.83

[56] References Cited

U.S. PATENT DOCUMENTS

| | | |
|---|---|---|
| 2,875,580 | 3/1959 | Moy et al. ............................. 60/261 |
| 3,118,276 | 1/1964 | Keenan et al. . |
| 3,587,232 | 6/1971 | Bryce .................................... 60/261 |
| 3,595,024 | 7/1971 | Kohler et al. ......................... 60/261 |
| 3,750,402 | 8/1973 | Vdoviak et al. ...................... 60/261 |
| 3,765,178 | 10/1973 | Hufnagel et al. ..................... 60/261 |
| 4,527,390 | 7/1985 | Mar et al. . |
| 4,592,200 | 6/1986 | Benoist et al. ........................ 60/261 |
| 4,686,826 | 8/1987 | Koshoffer et al. .................... 60/261 |
| 4,798,048 | 1/1989 | Clements et al. ..................... 60/261 |
| 4,817,378 | 4/1989 | Giffin et al. ........................... 60/261 |

FOREIGN PATENT DOCUMENTS

1086315  2/1955  France .
2597157  10/1987  France .

*Primary Examiner*—Donald E. Stout
*Attorney, Agent, or Firm*—Bacon & Thomas

[57] ABSTRACT

A flow mixer and flame stabilizer structure for an afterburner of a turbofan engine is disclosed having a variable mixer to mix a portion of the cold flow with the hot flow gasses and which also forms a flame stabilizer for a secondary afterburner fuel injection manifold which injects fuel into the cold flow air during afterburner operation. The device forms a flame stabilizer around the secondary, annular fuel injection manifold and has a generally "U" shaped cross-section. One of the legs forming the "U" shape is fixed, while the opposite leg is movable so as to vary the downstream facing opening between the legs. The movable leg also blocks a portion of the cold flow duct to generate localized increases in pressure upstream of the stabilizer. An air scoop located in this upstream portion communicates with the primary afterburner flame stabilizer to direct pressurized air to cool the primary flame stabilizer.

15 Claims, 4 Drawing Sheets

4,899,539

FLOW MIXER AND FLAME STABILIZER FOR A TURBOFAN ENGINE

BACKGROUND OF THE INVENTION

The present invention relates to a turbofan-type turbojet engine having an afterburner, more particularly a flow mixer and afterburner flame stabilizer for such an engine.

In known turbofan-type turbojet engines, a duct within the outer casing of the engine divides the airflow downstream of the low pressure compressor into a cold flow portion and hot flow portion. The air passing into the hot flow portion is directed into the combustion chambers, mixed with fuel and ignited. The cold flow air passes around the combustion chambers without being mixed with fuel or ignited.

In such engines, controlling the bypass ratio (the ratio of air flow through the cold flow duct with respect to that flowing through the hot flow duct) optimizes engine operation over a wide range of conditions, from subsonic cruising (with a high bypass ratio) to high altitude, high speed operation (with a low bypass ratio).

It is also known to equip such turbofan engines with afterburners to enable higher altitude, higher speed operations. As is well known in the art, additional fuel is injected into the hot gas flow, downstream of the combustion chambers, and ignited to augment the thrust of the engine.

It is known to vary the bypass ratio by directing at least a portion of the cold flow into the hot flow gas stream downstream of the afterburner combustion area, as typified by U.S. Pat. No. 3,118,276 to Keenan et al.

Known afterburner systems typically incorporate an afterburner flame stabilizer and it is also known to tap a portion of the cold flow to cool the afterburner stabilizer as noted in U.S. Pat. No. 3,595,024 to Kohler.

The known systems, however, cause a loss of pressure in the bypass flow causing the flow to deviate from its optimum flow path and incurring pressure losses.

SUMMARY OF THE INVENTION

In accordance with the present invention, a flow mixer and flame stabilizer structure for an afterburner of a turbofan engine is disclosed having a variable mixer to mix a portion of the cold flow with the hot flow gasses and which also forms a flame stabilizer for a secondary afterburner fuel injection manifold which injects fuel into the cold flow air during afterburner operation.

The device forms a flame stabilizer around the secondary, annular fuel injection manifold wherein the stabilizer has a generally "U" shaped cross-section. One of the legs forming the "U" shape is fixed, while the opposite leg is movable so as to vary the downstream facing opening between the legs.

The movable leg also blocks a portion of the cold flow duct to generate localized increases in pressure upstream of the stabilizer. An air scoop located in this upstream portion communicates with the primary afterburner flame stabilizer to direct pressurized air to cool the primary flame stabilizer.

The secondary flame stabilizer may assume a generally annular shape corresponding to that of the secondary fuel injection manifold. In this case, the movable leg portion has a plurality of movable segments which may be either located radially inwardly or radially outwardly of the stationary leg.

The device according to this invention improves the cooling of the afterburner flame stabilizers without inducing interfering pressure losses in the cold flow stream, while at the same time enabling the bypass ratio to be set to optimize engine parameters.

DETAILED DESCRIPTION OF THE PREFERRED EMBODIMENTS

Figure 1:
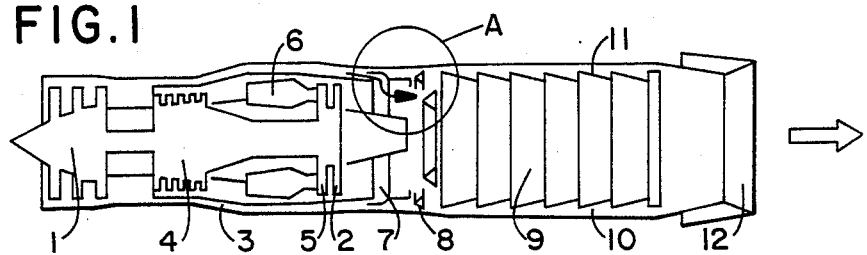
FIG. 1 is a longitudinal sectional view of a turbofan-type turbojet engine incorporating the device according to the invention.

FIG. 1 illustrates a bypass turbofan engine having a low pressure compressor 1 driven by a low pressure turbine 2. The air flow downstream of the low pressure compressor 1 is divided into two parts, a cold flow passing into an annular channel 3 enclosing the engine and a hot flow which undergoes a second compression in a high pressure compressor 4 driven by high pressure turbine 5 in known fashion. The hot flow compressed air passes into combustion chamber 6, is mixed with fuel and ignited in known fashion to produce an exhaust gas which drives turbines 2 and 5.

Energy may be added to the exhaust gases to increase the thrust of the engine by an afterburning system comprising radial primary fuel injectors 7 to inject fuel into the hot flow downstream of the low pressure turbine 2. The afterburning system may further include an annular secondary fuel injection manifold 8 for afterburning the cold flow and located at the confluence of the hot and cold gas flows. The mixed flows pass downstream through afterburner channel 9 of which the case 10 is cooled by cooling jacket 11 consisting of tiles, or perforated and corrugated sheet metal as is well known in the art. The reheated gases pass into the atmosphere through exhaust pipe 12.

Figure 3:
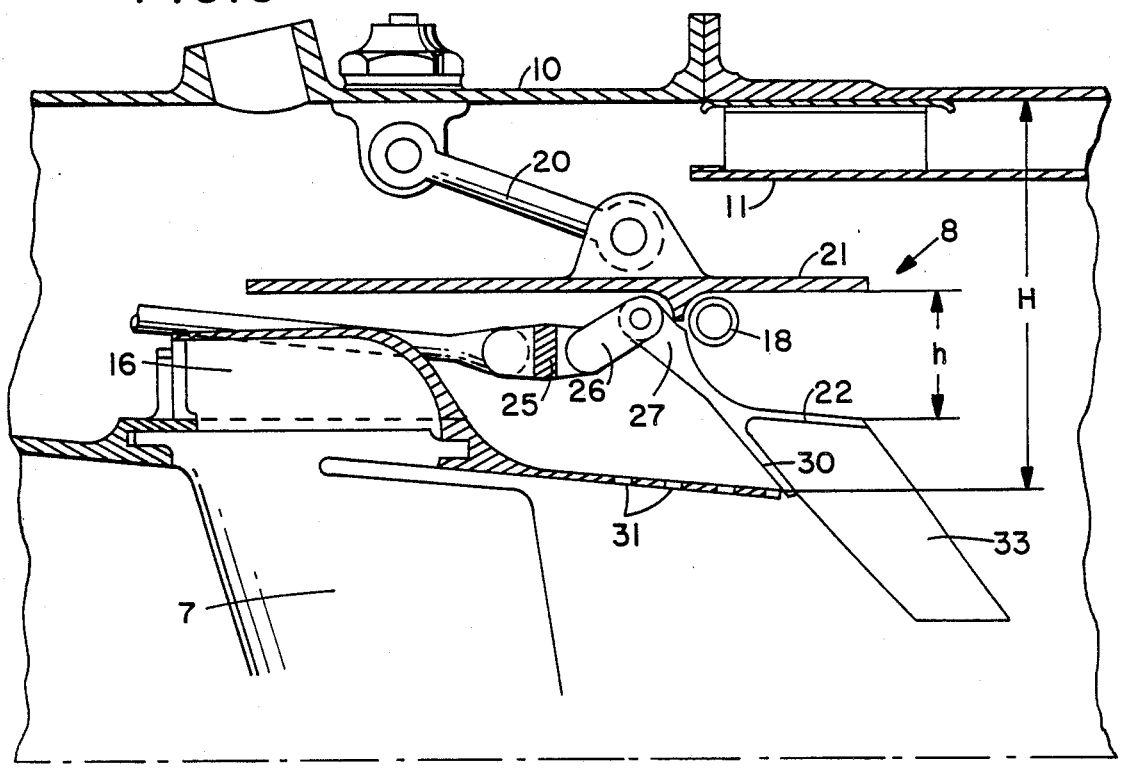
FIG. 3 is a partial, cross-sectional view illustrating the structure of FIG. 2 with the secondary flame stabilizer in the open position.
Figure 4:
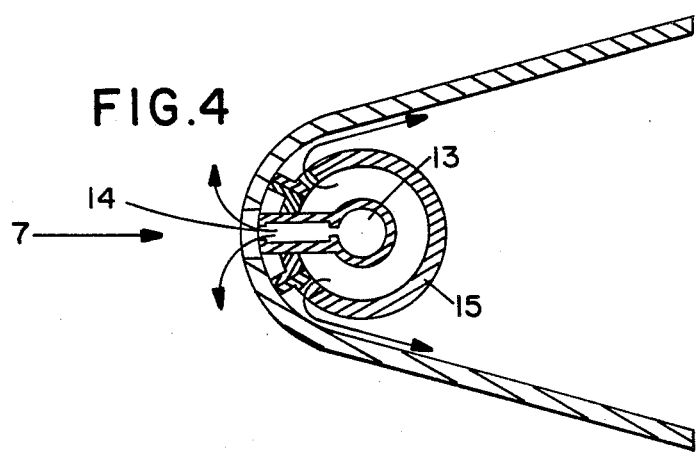
FIG. 4 is a partial, cross-sectional view of the primary afterburner flame stabilizer taken along line A—A in FIG. 2.

According to a first embodiment of the invention, illustrated in FIGS. 2-5, the primary hot flow is reheated by radial primary afterburner fuel injectors 13 located inside the primary flame stabilizers 7. As best illustrated in FIG. 4, the primary afterburner fuel injectors 13 define orifices 14 from which the fuel issues in counterflow fashion upstream of the primary flame stabilizer 7. The injectors 13 are enclosed by a circular sleeve 15 which directs cooling air, tapped by air scoop 16 located in the cold flow portion outside the intermediate casing 17, which separates the hot and cold flows. The air passing into the sleeve 15 through the air scoop 16 passes through perforations in the sleeve 15 to cool the flame stabilizer 7 by impact and convection cooling.

The structure according to the invention provides for reheating a portion of the cold flow by injecting fuel through secondary afterburner injection manifold 18 located inside of secondary flame stabilizer 8. Secondary flame stabilizer 8 has a generally "U" shaped cross-section and comprises two legs, a stationary leg 21 and movable leg 22. The leg 22 may be formed by a downstream portion of generally annular shaped intermediate sleeve 19 which splits the cold flow into two annular streams. The sleeve 19 is attached to the outer case 10 by links 20 having one of their ends attached to the outer case 10 and the opposite end attached to the intermediate sleeve 19.

Figure 5:
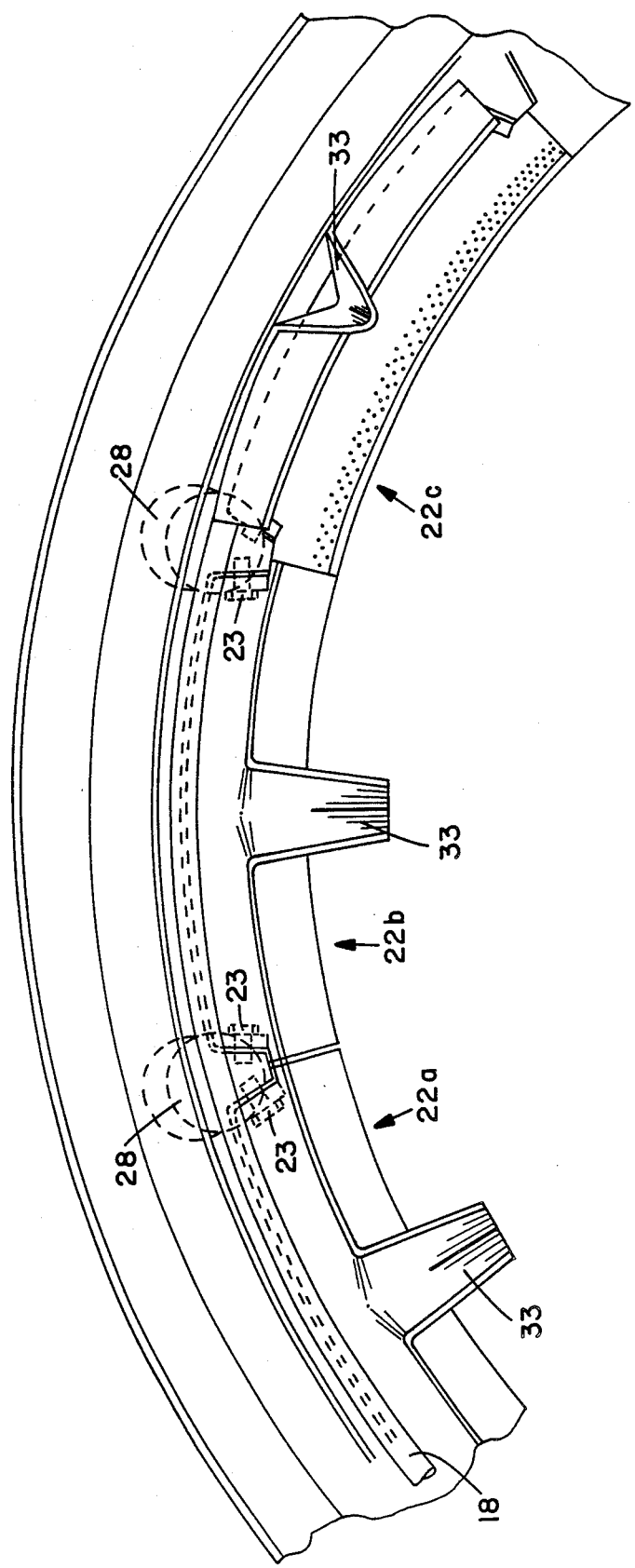
FIG. 5 is a partial, rear elevational view viewed in the direction of Arrow F in FIG. 2.

In the embodiment shown in FIGS. 2-5, the secondary flame stabilizer 8 has a generally annular shape corresponding to the annular secondary fuel injection manifold 18 and the movable leg 22 is located radially inwardly of the stationary leg 21. As shown in FIG. 5, the movable leg 22 may comprise a plurality of generally arcuate segments 22a, 22b, etc., each of which may cover 1/12 of the stabilizer circumference. Each segment is fastened to the stationary leg 21 by shafts 23 extending through lugs 24 attached to leg 21.

The movable legs 22 are moved via a cylindrical jack-type actuator 28 having an actuating cylinder attached to a fixed ring 29 of the engine, each of the cylinders having an extendible and retractable piston rod. The piston rods are connected to a synchronizing ring 25 which, in turn, is connected to each of the movable legs 22 by links 26. Movement of the piston rods causes each of the movable legs 22 to move between a closed position, illustrated in FIG. 2, wherein the downstream edges of the movable leg 22 and the fixed leg 21 ar either in contact with each other or in very close proximity and an open position, illustrated in FIG. 3, wherein the downstream edges of the fixed and movable legs are separated by a generally radial distance h.

Annular wall 30 extends in a generally radially inwardly direction from movable leg 22 and is dimensioned such that, when the movable leg 22 is in its open position, the inner most edge of wall 30 contacts the downstream edge of intermediate case 17. This contact seals off the gas flow passing between intermediate case 17 and intermediate sleeve 19. Only the cold flow air passing through perforations 31 formed in the downstream portion of intermediate case 17 will pass cold flow air into the hot flow stream. By blocking off the cold flow air between the intermediate case 17 and the intermediate sleeve 19, a localized pressure increase is generated in the space 32 between the intermediate case 17 and the intermediate sleeve 19. This excess pressure causes the saturation of the air scoops 16 with cooling air so as to maximize the cooling of the primary flame stabilizer 7 during operation of th afterburner.

Figure 2:
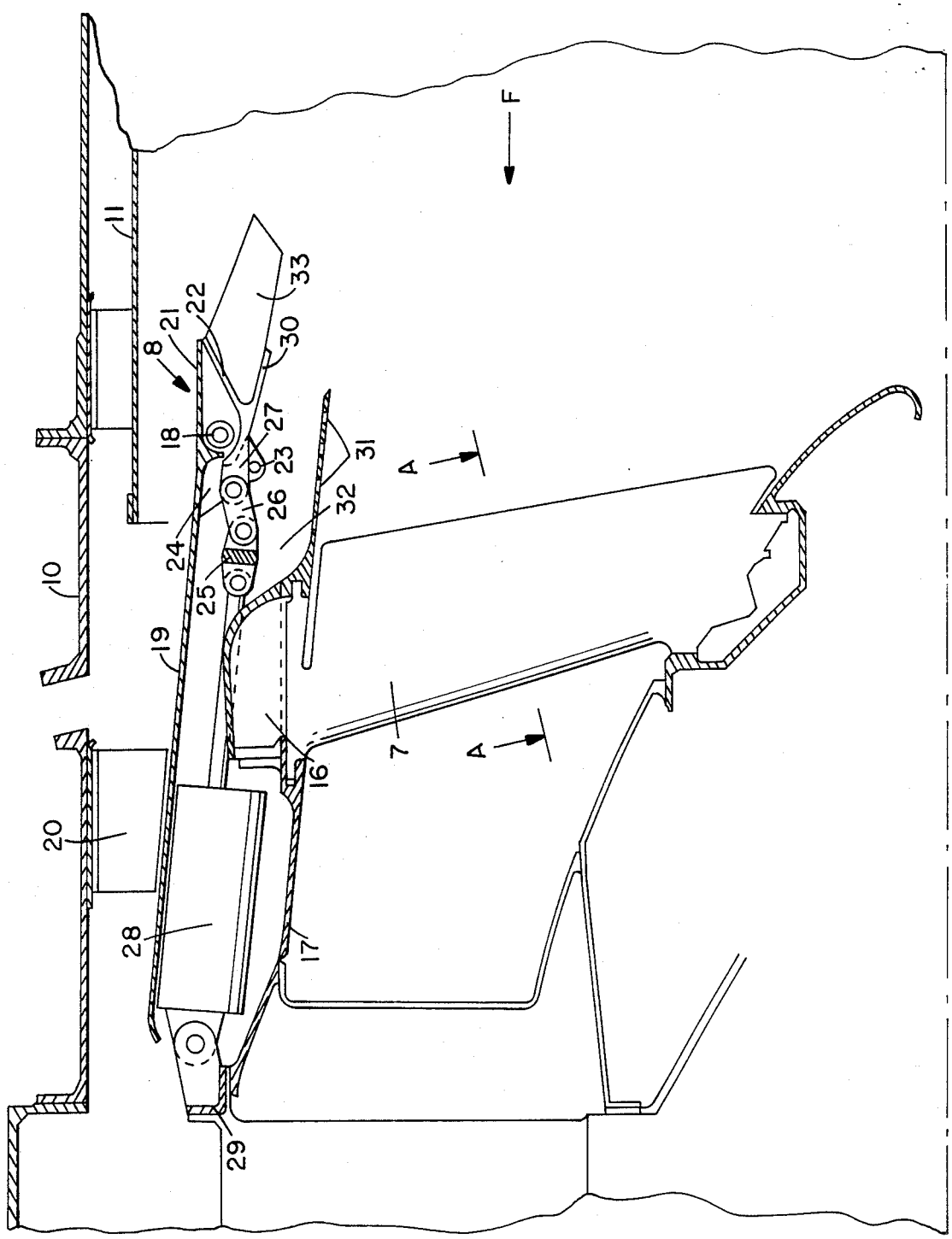
FIG. 2 is a partial, enlarged cross-sectional view of the device according to the invention taken at A in FIG. 1.

Each of the movable leg segments 22 has a generally radially extending trough 33 formed thereon such that the troughs extend into the hot flow gas stream when the movable legs 22 are in their open position, as illustrated in FIG. 3. These troughs optimize the mixture of hot and cold flows when the movable leg 22 is open. When the movable leg 22 is in the closed position, as illustrated in FIG. 2, the troughs 33 have little or no aerodynamic effect, since they are retracted downstream of the secondary flame stabilizer 8.

Figure 6:
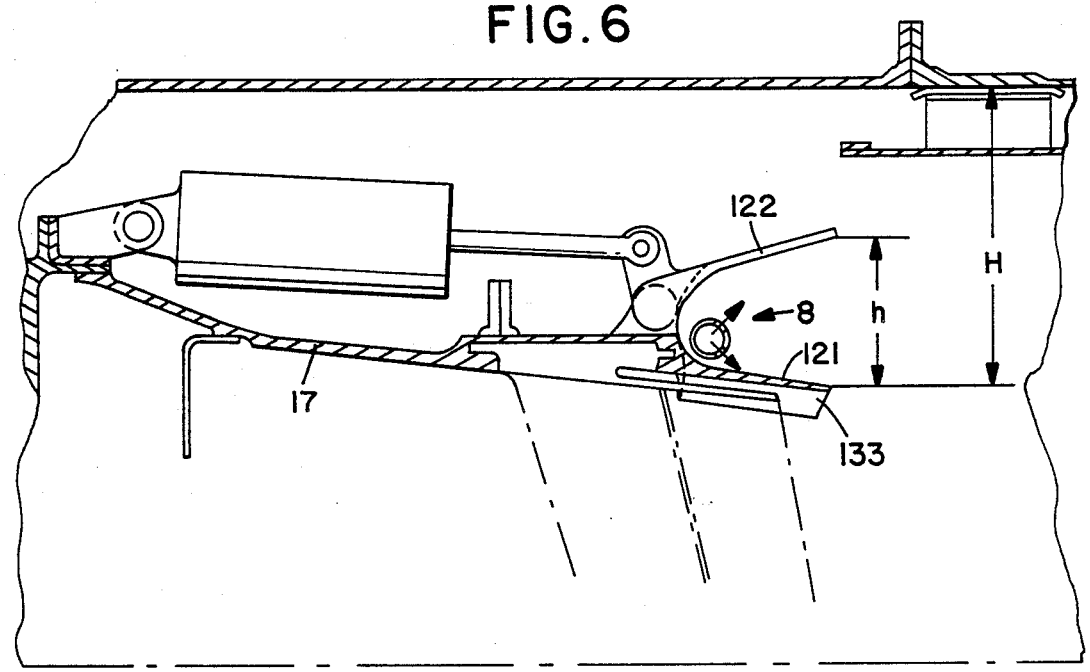
FIG. 6 is a partial, cross-sectional view illustrating a second embodiment of the invention with the secondary flame stabilizer in the open position.
Figure 7:
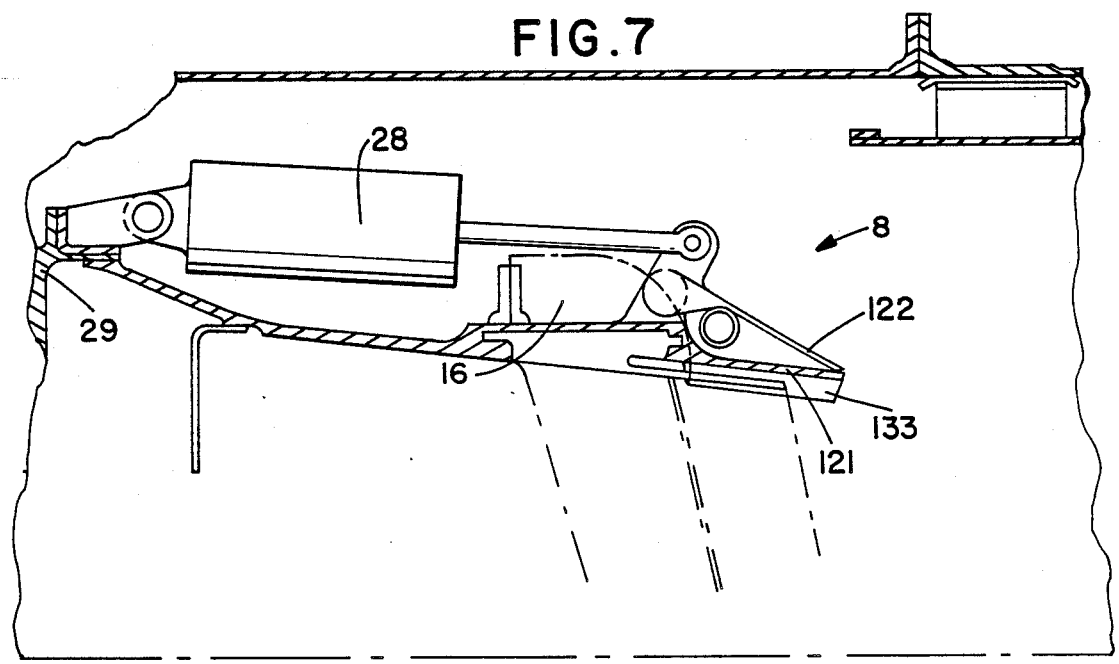
FIG. 7 is a partial, cross-sectional view corresponding to FIG. 6 showing the secondary flame stabilizer in the closed position.

An alternative embodiment is illustrated in FIGS. 6 and 7 wherein the movable leg 122 of the secondary flame stabilizer 8 is located radially outwardly of stationary leg 121. Stationary leg 12 is formed by the downstream portion of intermediate case 17 and is located downstream of air scoops 16. As in the previous embodiment, the secondary fuel injection manifold may assume an annular shape as is that of the secondary flame stabilizer 8. Thus, the movable leg 122 may also be formed of a plurality of arcuate segments.

FIGS. 6 and 7 illustrate the direct attachment of the rods of the actuators 28 to each of the segments forming movable wall 122. However, it is to be understood that a synchronizing ring, illustrated in FIGS. 2 and 3, may also be utilized with this alternative embodiment.

Radial troughs 133, corresponding in function to the troughs 33 of the previously described embodiment may be formed on the stationary leg 121 as illustrated.

In both of the embodiments, the radial height h between the downstream edges of the movable and fixed legs when in the open position is approximately equal to 30% of the radial height H between the outer casing 10 and the downstream edge of intermediate case 17. This value has been found to provide the optimal performance of the turbojet engine.

In operation, during low power, subsonic cruising without the use of the afterburner, the movable leg portions 22 and 122 will be in their closed positions, as illustrated in FIGS. 2 and 7 so as to maximize the bypass ratio. The controlled opening of the movable legs 22 and 122 during intermediate power modes of operation without the afterburner allows the bypass ratio to be continuously optimized. During maximum power, afterburner operation, the movable legs 22 and 122 are in their maximum open positions as illustrated in FIGS. 3 and 6 thereby minimizing the bypass ratio and maximizing the flow of cooling air over the primary flame stabilizers 7. It has been found that the excess pressure relative to operation at intermediate power will increase the ventilation of the primary flame stabilizers 7 by approximately 15%.

When the movable legs are in their closed positions, the amount of air tapped from the cold flow by air scoops 16 is inherently reduced without the need for a valve or the like to seal the intakes of the scoops 16. The control actuators may be connected to the engine computer to allow varying the opening of the movable legs in order to regulate the opening height h to the minimum value which is compatible with combustion flame stability. This minimizes overall pressure losses, while at the same time assuring stable burning.

The foregoing description is provided for illustrative purposes only and should not be construed as in any way limiting this invention, the scope of which is defined solely by the appended claims.

We claim:

1. In a turbojet engine having an outer casing, an afterburner portion, primary afterburner fuel injectors extending substantially radially with respect to a longitudinal axis of the engine, primary flame stabilizers associated with the primary afterburner fuel injectors, the improvements comprising:
   (a) an intermediate casing located within the outer casing and dividing the gas flowing through the turbojet engine into hot and cold gas flow portions such that the primary afterburner fuel injectors are operatively associated with only the hot gas flow;
   (b) a secondary afterburner fuel injection manifold located at the confluence of the hot and cold gas flow portions;
   (c) a secondary flame stabilizer associated with the secondary afterburner fuel injection manifold comprising a fixed leg having a portion extending downstream of the secondary afterburner fuel injection manifold and a movable leg having a portion extending downstream of the secondary afterburner fuel injection manifold; and, (d) actuator means operatively associated with the movable leg so as to move the movable leg between a closed position wherein downstream edge portions of the movable leg and the fixed leg are in close proximity to each other, and an open position wherein downstream edge portions of the movable leg and the fixed leg are separated a maximum distance h.

2. The improved turbojet engine according to claim 1 further comprising air scoops extending into the cold gas flow and associated with the primary flame stabilizer so as to direct cooling gas into the stabilizers, the air scoops being located upstream of the secondary flame stabilizer such that, when the movable leg is in the open position, gas flow through the scoops is at its maximum value.

3. The improved turbojet engine according to claim 1 wherein the secondary flame stabilizer is substantially annular in shape and the movable leg comprises a plurality of individual segments.

4. The improved turbojet engine according to claim 3 wherein the actuator means comprises a plurality of cylinders having extendible and retractable rods and further comprising a synchronizing ring connected to the rods of the actuator and to each of the individual segments.

5. The improved turbojet engine according to claim 1 wherein the intermediate casing is located a radial distance H from the outer casing such that $h \leq 0.3H$.

6. The improved turbojet engine according to claim 1 wherein the secondary flame stabilizer has a substantially annular shape and wherein the movable leg is located radially inwardly of the fixed leg.

7. The improved turbojet engine according to claim 6 further comprising a generally annular wall extending generally radially inwardly from the movable leg such that, when the movable leg is in the open position, the wall contacts the intermediate casing.

8. The improved turbojet engine according to claim 6 further comprising a mixing trough extending generally radially inwardly from each movable leg segment such that, when the movable leg is in the open position, the mixing trough extends into the hot gas flow.

9. The improved turbojet engine according to claim 8 wherein each trough has a generally "U" shaped cross-section.

10. The improved turbojet engine according to claim 6 further comprising:
(a) an intermediate sleeve located between the intermediate casing and the outer casing, the intermediate sleeve having a downstream portion forming the fixed leg of the secondary flame stabilizer; and,
(b) attaching means to attach the intermediate sleeve to the outer casing.

11. The improved turbojet engine according to claim 10 wherein the attaching means comprises a plurality of link bar fastened between the intermediate sleeve and the outer casing.

12. The improved turbojet engine according to claim 6 wherein a downstream portion of the intermediate casing defines a plurality of perforations.

13. The improved turbojet engine according to claim 1 wherein the secondary flame stabilizer has a substantially annular shape and wherein the movable leg is located radially outwardly of the fixed leg.

14. The improved turbojet engine according to claim 13 wherein a downstream portion of the intermediate casing forms the fixed leg of the secondary flame stabilizer.

15. The improved turbojet engine according to claim 1 further comprising:
(a) a cooling tube concentrically located about the primary afterburner fuel injectors;
(b) a cooling air scoop having an axial intake located in the cold gas flow and operatively associated with the cooling tube to direct cooling air from the cold gas flow into the cooling tube; and
(c) a plurality of perforations defined by the cooling tube so as to direct cooling air onto the primary flame stabilizer to cool the stabilizer.

* * * * *

UNITED STATES PATENT AND TRADEMARK OFFICE
CERTIFICATE OF CORRECTION

PATENT NO. : 4,899,539

DATED : February 13, 1990

INVENTOR(S) : Phillippe M. D. GASTEBOIS et al

It is certified that error appears in the above-identified patent and that said Letters Patent is hereby corrected as shown below:

Col. 3, line 34, "ar" should be --are--.

Col. 3, line 54, "th" should be --the--.

Col. 3, line 68, "12" should be --121--.

Claim 11, line 19, "bar" should be --bars--.

Signed and Sealed this

Twenty-eighth Day of May, 1991

Attest:

HARRY F. MANBECK, JR.

*Attesting Officer*   *Commissioner of Patents and Trademarks*